Figure 1:
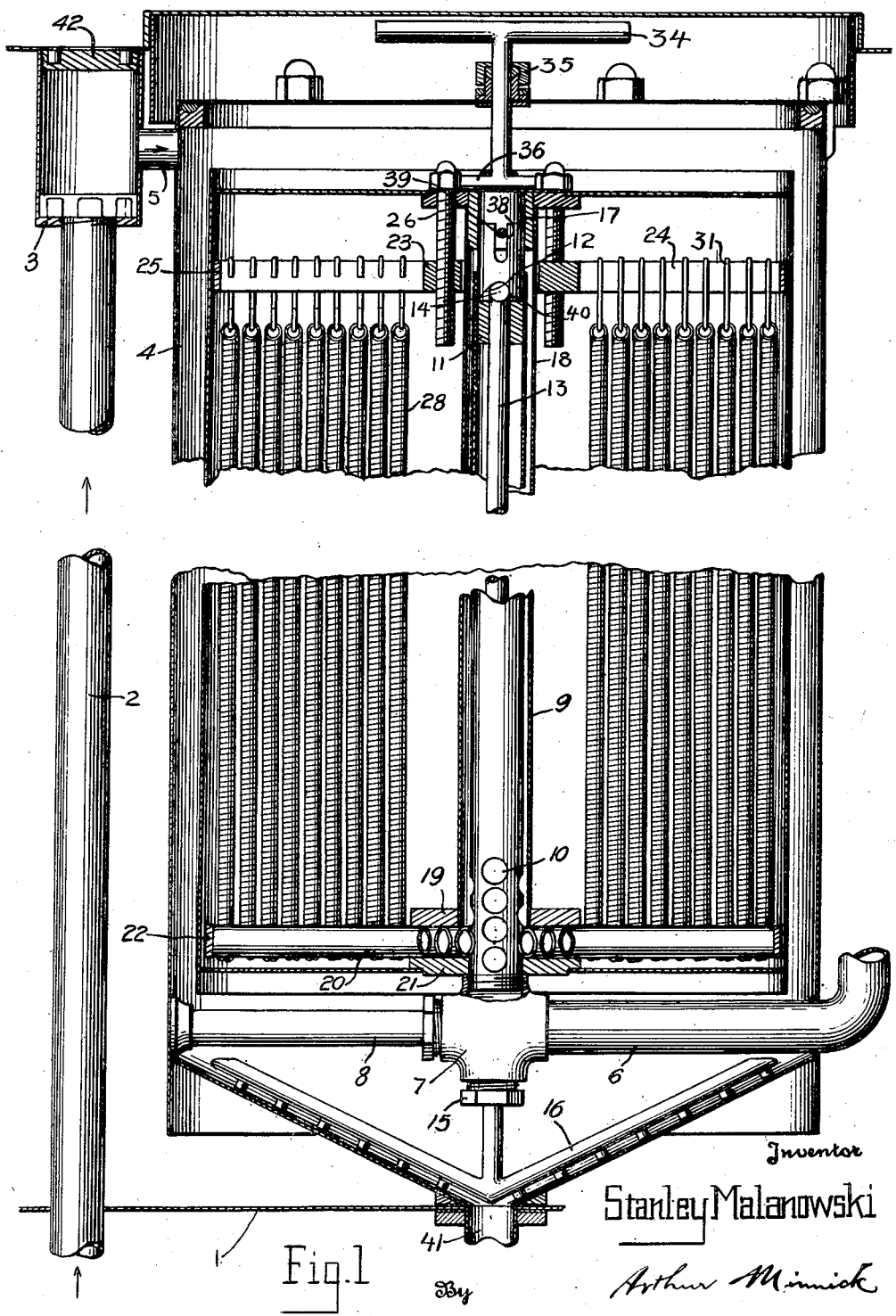

Nov. 10, 1942.　　S. MALANOWSKI　　2,301,430
FILTER
Filed April 11, 1938　　2 Sheets-Sheet 1

Inventor
Stanley Malanowski
By Arthur Minnick
Attorney

Nov. 10, 1942.  S. MALANOWSKI  2,301,430
FILTER
Filed April 11, 1938   2 Sheets—Sheet 2
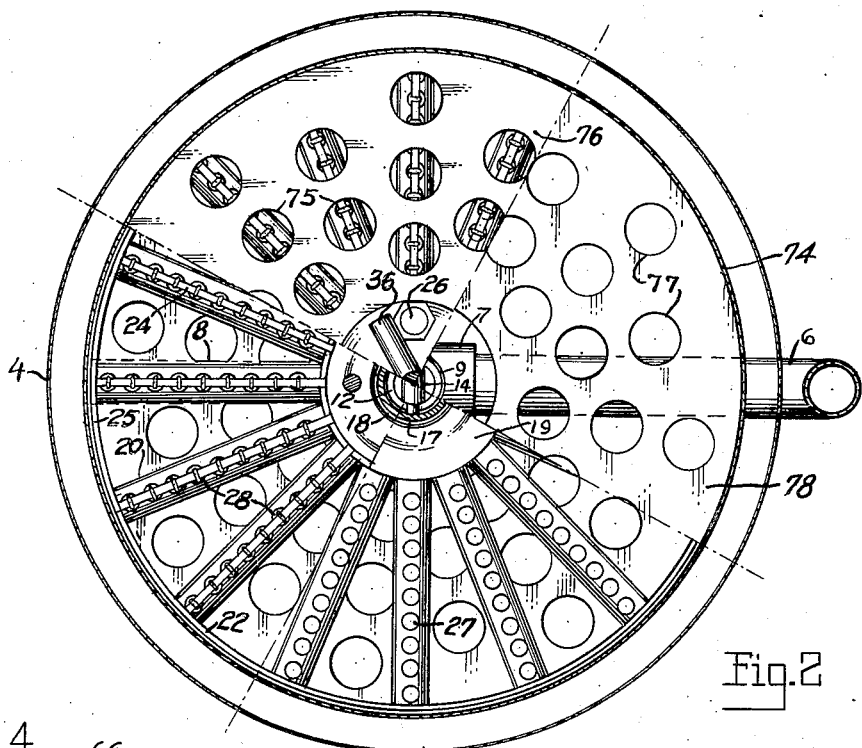
Fig.2
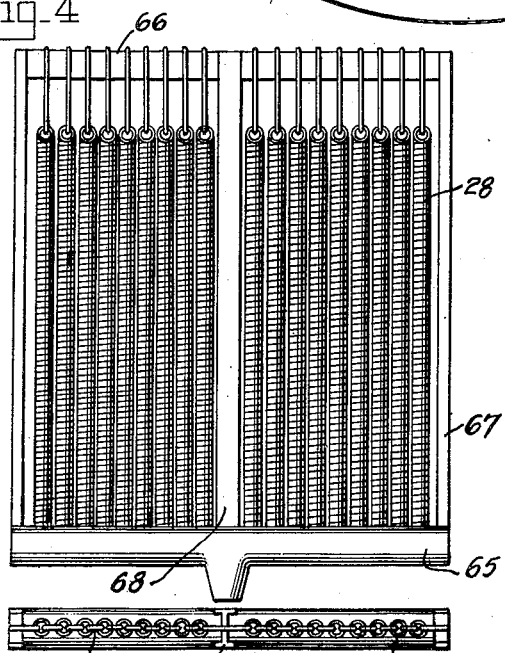
Fig.4
Fig.5
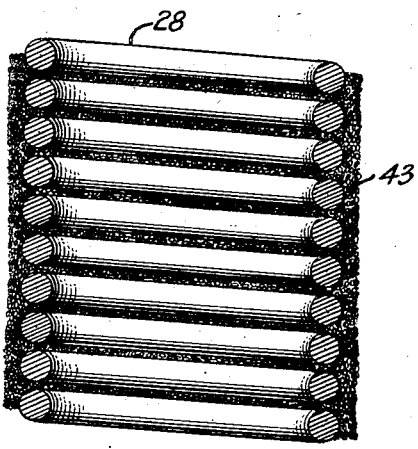
Fig.3
Inventor
Stanley Malanowski
Arthur Minnick
Attorney Patented Nov. 10, 1942

2,301,430

UNITED STATES PATENT OFFICE 2,301,430

FILTER

Stanley Malanowski, Tampa, Fla.

Application April 11, 1938, Serial No. 201,278

14 Claims. (Cl. 210—184)

This invention relates to filter elements and has for its primary object to utilize the properties of an elastic spiral to provide a simple and efficient filtration unit for liquids under pressure. By using a closely wound helical spiral of elastic metallic wire held under tension with the coils uniformly separated by a gap of less width than the diameter of particles to be restrained from passage, a tubular unit is provided which has ample strength to resist the inward pressure of the liquid surrounding it. If the spiral aperture formed by the space separating the coils is sufficiently narrow, the unit will act as a filter to permit the passage of liquid only and preventing the passage of solids in suspension.

Such a unit formed with a relatively wide aperture may serve as a core or support upon which fibrous materials and filter aids may be temporarily supported by the pressure of the liquid during the filtration process and by the mutual adhesion of the particles of filtered material. The nature of the adhesion between the metallic core and the filter aid is such that when the pressure required to force the liquid through the accumulated mass becomes greater than is deemed economical, the operator can easily dislodge the sludge and the filter aid from the core to leave it ready for the next application of filter aid in preparation for continued filtration.

A further object of the invention is to provide a form of construction in which the elements may be readily assembled in a compact group having a large capacity in proportion to its size.

It will be understood that the invention is not limited to the exact arrangement of parts or to the details of construction shown in the accompanying drawings.

Solids in suspension may be separated from liquids by the use of filters having the passages for the liquids formed as apertures of smaller dimensions than those of the particles of solids to be held back. To operate efficiently, the filter must have a total area of passages to permit the liquid to flow through the filter under the pressure applied within the available time, and it must have sufficient rigidity to resist the pressure.

It has been a common practice to use fibrous pulps held upon metallic screens or upon perforated supports, the irregular spaces between the fine fibers of the pulp being small enough to retain the larger particles of the solids and these in turn having interstices between them small enough to retain the smaller particles.

With these pulp filters, as with other types, it has been a common practice to use filter aids such as wood flour, clays, diatomaceous earth, and charcoals as a preliminary deposit to close the interstices between the fibers sufficiently to retain the finest particles to be removed. As the solid matter increases, if there are enough of the smaller particles to close the gaps between the larger particles, the area for the passage of liquid will be reduced to a degree such that the filter will become inefficient. This clogging of the filter necessitates a renewal of the filtering material, as for example, by the removal and washing of the pulp before it can be replaced, or if such washing is not practical, by the provision of new material.

In many cases where such pulp is not satisfactory, various woven fabrics of textile fibers or of metallic wire have been used, frequently with cores or supports of heavier material to withstand the pressure of the liquid, the mesh of such fabrics being made fine enough to hold the filter aids. But these woven fabrics are also subject to clogging, and when their meshes have become closed by the solids, they must be scraped and scrubbed to remove the accumulated sludge.

The spaces between the strands or filaments of a woven fabric are determined by the diameter or thickness of the finest strands whether of the warp or weft, but if the filaments or strands ran substantially parallel with each other without interwoven cross strands, it is evident that the space between the strands could be made very narrow.

An elastic wire can be wound to form a cylindrical spiral or helix whose rounds have the same diameter. A wire of circular cross section wound in a close helix will have the adjacent surfaces in a line contact, this line of contact forming a non-plane curve, the tangents to which bear equal inclinations to the axis of the cylinder formed by the helix. This is such a curve as is described by every point in a screw turned round in a fixed nut. Such a coil formed under tension will have the adjacent surfaces held in such close contact that force will be required to separate them and if such a coil is stretched longitudinally within its elastic limit, the coil will close again when released, the tension tending to force the surfaces into contact throughout their length.

A piece of homogeneous elastic material of uniform cross section will resist distortion equally at all points in its length. If a helical coil made of metallic wire of uniform section and of uniform composition is held firmly at one end and the other end is pulled away longitudinally of the axis, the distortion produced will be equally distributed throughout the length of the spiral because of the uniformity of cross section and because of the uniformity of elasticity in the homogeneous material.

As an illustration, assume that the wire used for the spiral coil is .025 inch in diameter and that the coil is twenty-five inches in length. A wire of .025 inch diameter will make forty turns to each inch or one thousand turns in the twenty-five inches of its length. With the lower end fixed, if the upper end of the coil is moved upward one full inch, the distance between each turn and the next will be increased only .001 inch, and in the suspension means later to be described in which the adjustment is made by turning a nut on a bolt, the extension of the entire coil may be made a very small fraction of an inch, with an exceedingly small variation in the width of the helical aperture between the coils. A wire of .025 inch diameter formed as a helical coil with a length of twenty-five inches and a coil diameter of a quarter of an inch, provides a highly elastic element which offers very little resistance to sidewise pressure.

In the preferred embodiment of the present invention, to provide for a large capacity the assembly will comprise a plurality of filtration units, each unit consisting of an elastic metallic wire of uniform section coiled in a helical spiral under tension with the elasticity of the metal tending to bring the adjacent surfaces along the helix into contact and having means to support each helical tube under sufficient tension to separate the coils to form a continuous spiral aperture throughout the length of each tube and each tube being in communication with a passage for the outlet of the filtered liquid.

In the drawings, Figure 1 is a vertical section with parts broken away and parts in the background omitted, through a filter having a filtration unit embodying a preferred construction; Fig. 2 is a plan view looking downward from four different levels in the structure of Fig. 1 the upper portion at the left being seen looking downward from above the top 76 of the sheet metal container 74, the lower left portion being seen looking downward from just below the top of the container, the lower right portion being seen looking downward from the level of the top of the manifold tubes 20, the wire coils being omitted, and the upper right portion being seen looking downward from just above the bottom of the container; Fig. 3 is a diagrammatic fragmentary section on an enlarged scale through one of the helical elements; Fig. 4 is an elevation and Fig. 5 a plan view of a different type of filtration unit embodying the helical elements of the same construction as those used in the embodiment in Fig. 1.

The construction illustrated in Figs. 1 and 2 will best be understood by referring to the disclosure in my previous application Serial No. 158,455, filed August 11, 1937, which has since become Patent No. 2,269,725 of January 13, 1942.

The device shown in this previous application is a pressure filter system in which a storage tank 1 has mounted therein a filter tank capable of receiving the fluid to be clarified either from the storage tank or from an outside source, as a washing machine, and also capable of delivering the clarified fluid either to the storage tank or to an outside place of delivery, which may be the same washing machine, thus providing a cyclic operation of removing dirty fluid, clarifying it, and returning it immediately for continued use.

In the present apparatus, the inlet pipe 2 leads to a filter aid chamber 3 which is connected to the tank 4 by a short pipe 5. In the lower end of the tank 4 is an outlet pipe 6 for the clarified liquid, having at its inner end a fitting 7 held in a central position by the pipe 6 and by a brace pipe 8 secured to the wall of the tank 4. Extending upward from the fitting 7 is a tube 9 having near its lower end a group of perforations 10. At a short distance down from the top of the tube 9 is a plug 11 upon which normally rests a ratchet element 12 which is freely slidable up and down in the tube 9 above the plug. The plug is centrally perforated for a rod 13 having a T head 14 resting upon the upper surface of the plug. The lower end of the rod 13 is mounted for rotation in a bushing 15 in the lower end of the fitting 7 and has two arms 16 extending in opposite directions closely adjacent to the conical bottom of the tank 4.

Mounted for rotation on the tube 9 is a filter assembly which has a cap 17 secured within the upper end of a tube 18, the lower end of which has attached thereto a plate 19. This plate 19 has brazed, soldered, or welded thereto on its lower surface, the inner ends of a plurality of radially extending tubes 20, and a similar plate 21 secured to the tubes 20 on their under surfaces opposite the plate 19 and having a central opening for the tube 9, forms with the plate 19 a chamber surrounding the tube 9 to receive filtered liquid coming from the manifold tubes 20.

As shown in Fig. 2, these tubes 20 radiate outward from between the plates 19 and 21 at intervals of one-sixteenth of a circle, and their outer ends are closed and held rigidly in position by a hoop 22. The inner ends fit closely together and any spaces between them and the plates are closed during the assembling operation.

Secured to a hub 23 and directly above each tube 20 is a supporting bar 24, a hoop 25, similar to the hoop 22, being attached to each bar 24 at its outer end. The hub 23 has a plurality of threaded openings for the reception of adjusting screws 26 carried by the cap 17. By rotating these screws, the hub 23 can be adjusted up or down, carrying with it the bars 24. Each manifold tube 20 has a plurality of spaced openings 27 to receive the lower ends of helical coils 28 which may be secured to the tubes 20 as shown in Fig. 4, by cotter pins engaged with loops on the coils and passing through perforations 30 in the bottoms of the tubes. The outwardly bent ends of the cotter pins will resist any upward pull and the perforations 30 will be closed by the bodies of the pins. The perforations 27 will be made of a size only sufficient to admit the cylindrical helical coils. The upper ends of the coils, as best shown in Fig. 11 are attached to the bars 24 by hooks 31 and are closed by thin metallic plates 32 thrust between two adjacent turns and held by solder 33.

The helical coils will be of the closely wound type and when they are adjusted in position within the tubes 20 and upon the bars 24, the cotter pins 29 and the hooks 31 can readily be secured to hold all of the coils tight and evenly drawn into position. As the screws 26 are turned to lift the hub 23, the bars 24 will move upwardly in unison and each elastic coil will be expanded by substantially the same amount. As has previously been suggested, since the expansion caused in the helix by pulling one end away from the other fixed end is distributed equally among all the turns, and since a lift of a whole inch at the upper end causes about a thousandth of an inch separation of the abutting surfaces of the coils, minor irregularities or differences in the individual helices will be negligible and well within the limits of permissible variation. The coils, as illustrated in Fig. 1, are very narrow or of small diameter as compared with their length, and the wire of which they are made will normally be approximately .025 inch in diameter. The coils are thus highly elastic and are free throughout their length. With a coil diameter of a quarter inch and a length of twenty-five inches, it will be seen that the diameter is only one hundredth of the length of the coil.

As shown in Figs. 1 and 2, there are nine coils in a row on each of the sixteen supporting arms and tubes or a total of one hundred and forty-four coils in the example illustrated. With the suggested separation of a thousandth of an inch between turns and a thousand turns in their length, this would give each coil an aperture of three-quarters of a square inch or, for the 144 coils, an aperture of three-quarters of a square foot or more. This is a great capacity for a container of small cubical dimensions and it is evident that this capacity could easily be increased by using more coils.

It will be seen that as the diameter of the wire used for the coils is made smaller, there will be more turns in a given length of coil with the same spacing of the turns, and as the diameter of the coil is made greater, there will be a greater length of wire for any given length of coil with the same spacing of the turns. In each of these cases, the coil becomes more flexible and the aperture becomes greater with the greater length of wire.

But in a given space, one can place more coils of small diameter than coils of large diameter. Hence, the preferred arrangement will have a large number of coils of small diameter, and for proper elasticity of the coils, using the ordinary spring wire, the ratio of the diameter of the wire to that of the coil should not be much less than 1 to 7 or much greater than 1 to 10.

As is indicated diagrammatically in Fig. 3, the coils of the helix 28 are separated by a space of perhaps one-fifth the diameter of the wire. Particles of the filter aid suspended within the liquid to be filtered or within liquid used for a preliminary coating of the filtration units will be caught within the tapering narrow space between the turns and will hold other smaller particles behind them, thus building up a layer of pervious material through which the liquid will pass but which will hold back anything in suspension that is larger than the interstices between the particles of filter aid. Each addition of filter aid increases the area of the cylindrical surfaces until the row of coils has become a continuous wall. Liquid under pressure in the tank 4 passing through the filtration units into the interior of the coils will pass downward into the manifold tubes 20 and through the openings 10 in the tube 9 and thence through the fitting 7 to the outlet pipe 6.

When the pressure begins to rise, indicating that the spaces between the accumulated particles are closing, the addition of filter aid whose surface will be more pervious to liquid than that of the compacted sludge will allow another layer of sludge to form without much further rise in pressure until the density of the new layer of sludge again becomes such as to cause a resistance equal to that of the original layer. When the pressure becomes too great for efficiency, the pump will be stopped and the filtration assembly cleaned of the entire coating by a simple rotation or partial rotation within the liquid in the tank. This movement of rotation will cause the sludge and the charge of filter aid to break loose from the coils, since the inertia of the liquid will cause a sidewise pressure to which slight resistance has been built up. Each coil is pulled sidewise at its top and bottom simultaneously by a thrust exerted upon an arm 24 and a tube 20. There will be a considerable movement of the ends of the coil before the force exerted upon the arm and the tube and transmitted through the wire of the coil can overcome the resistance at the central portion of the coil offered by the inertia of the liquid. The long flexible coils will be bent sidewise in a curve as the ends move forward and the central portion lags behind. The extent of movement of the central portion of the coil may amount to several times the diameter of the coil, and this movement will cause a certain stretching which will increase the amount of separation of the turns of the coil. The adhesion of the filter aid to the metallic coils is originally due only to the pressure exerted by the liquid flowing through the spiral aperture in each coil. The layer of filter aid wedged into the tapering spaces formed by the circularly curved surfaces of the wires at each side of the apertures will adhere in much the same manner as plaster adheres to the latch upon a wall, except for the absence of the bond that forms on the inside in the case of plaster. After prolonged use, the sludge becomes closely compacted upon the outer surface of the filter aid layer as a gummy coating and in the absence of considerable vibration, the mass will continue to adhere even when the pump is stopped, but if the assembly is jarred or has sidewise forces applied by rotation, the slight adhesion of the filter aid upon the coil will be overcome, the gummy surface of the sludge will break, and the mass will fall downward through the liquid to the bottom of the tank 4. The compacted material will not be broken into minute particles, but will drop down to the bottom in adherent masses and there will be very little tendency for any of the impurities to be taken up again by the liquid.

A handle 34 having a stem passing through the stuffing box 35 on the top of the tank 4, will usually be turned counterclockwise to engage the cross bar 36 at the lower end of the stem with the heads of the screws 26. As the assembly starts to rotate, the ratchet member 12 will engage the side of the T head 14 of the rod 13 with a beveled surface 37, and since the head 14 offers a certain resistance, the member 12 will lift enough to ride over the head. A slot 38 in the member 12 is engaged by a cross pin 39 in the portion of the cap 17 which enters the tube 18, to cause rotation of the member 12 while permitting it to rise above the head 14.

Counterclockwise rotation of the handle 34 and hence of the assembly will discharge the sludge from the coils without any movement of the rod 13 or of its scraper arms 16, but rotation of the handle 34 in the clockwise direction with the cross bar 36 in engagement with the heads of the screws 26 and with the cross pin 39 in the slot 38 in the member 12 will turn the cap 17 and the member 12 together, and the vertical surface 40 of the ratchet member thrusting directly against the side of the head 14 will act to cause rotation of the rod 13 to move the arms 16 around the conical surface of the bottom of the tank 4. This scraping action will dislodge the sludge and give the liquid a rotary movement which will tend to carry the sludge to the central discharge pipe 41 at the lower end of the conical surface. As is disclosed in the previous application, the pipe 41 will, of course, have a valve.

With the filtration units cleared of sludge, a fresh charge of filter aid will be placed in the chamber 3, the cover 42 of the chamber screwed tight, and the pump started to drive liquid upward through the pipe 2 into the tank carrying with it the finely divided filter aid, 43, which will be deposited along the spiral apertures and outward on all sides as before.

If the operator wishes to observe how the process of filtration has proceeded, after the accumulation of sludge upon the surfaces of the filter aid coatings has become sufficient to cause an undesirable rise in the pressure necessary to continue filtration, he will stop the motor of the pump to relieve the liquid pressure in the tank. The cover may readily be removed from the tank, exposing the entire filter assembly to view and the operator may grasp the cap with his hand and lift the assembly upward along the tube 9, out of the pressure chamber, for inspection. If the sludge coating is sufficiently gummy and leathery, it might be possible to remove the assembly intact from the tank, but since the coils are so flexible that an unexpected vibration could cause the relatively fragile cylindrical column of plastic filter aid to become free from its spiral metallic core or support, it is better to avoid the chance of disaster by simply allowing the assembly to slide back down the tube 9 until near the bottom, when it may be dropped a little distance to let the plate 21 strike the upper face of the fitting 7. The jar caused by the sudden stop will cause longitudinal vibrations of the coils from end to end, opening the spaces between the coils to release the filter aid from all parts of the coils and the whole mass of refuse will drop downward between the radial tubes 20.

Since Fig. 3 is merely diagrammatic in illustrating a fragment of the coil of any unit, straight lines have been used in place of the theoretically correct sections of spirals.

The plate type of filter shown in elevation in Fig. 4 and in plan in Fig. 5 employs the same helical coils 28 as in Fig. 1, with their lower end held within openings in an outlet tube 65 and with their upper ends held by hooks engaging over a supporting bar 66 carried by two end bars 67 and a central brace 68 secured to the tube 65. Such a filter element may be used as a replacement unit in the type of structure shown in patent to Heckman, 2,041,763, May 26, 1936.

As a means for protecting the filtration element during shipment, a sheet metal container 74 will usually be found desirable, the construction of which will be similar to that shown in the previous application above mentioned. The cylindrical body of this container will be slightly larger in diameter than that of the hoops 22 and 25, and there will be perforations 75 in the top 76 as shown in the upper quadrant in Fig. 2, and perforations 77 in the bottom 78 through which sludge will be pushed by the tubes 20 as they are turned around just above the perforations.

It will be understood that the structures shown and described are intended as merely illustrative of the principles of the invention and that many changes and variations may be made by those who are skilled in the art without departure from the scope of what is claimed.

I claim:

1. A filter comprising a chamber for liquid under pressure, an elastic wire coiled in a spiral of great length as compared with its diameter and mounted within said chamber with the coils separated for the passage of liquid, the interior of the wire coil communicating with the exterior of the chamber for the discharge of liquid, a coating of finely divided material surrounding the said spiral coil and held thereon by pressure of the liquid, and means for causing transverse vibration of the said coil to dislodge the said coating.

2. A structure as in claim 1 having means for rotating the filter element within the liquid.

3. A structure as in claim 1 having means for causing transverse vibration of the coils between their ends.

4. A filter comprising a tank having a conical bottom provided with a discharge outlet at the apex of the cone, the bottom sloping downward toward the outlet, an outlet tube for liquid mounted vertically within the tank, a filter element slidably and rotatably mounted upon the outlet tube, a rod extending vertically through the outlet tube and having at its lower end an arm located adjacent to the conical bottom of the tank, and means engaging the rod when the filter element is rotated in one direction to cause rotation of the rod to move the arm along the bottom of the tank.

5. A structure as in claim 4 in which the means engaging the rod is inoperative to cause rotation of the rod when the filter element is rotated in the reverse direction.

6. A filter comprising a chamber for liquid under pressure, a filter element mounted within said chamber and consisting of a highly elastic wire coiled in a helix of great length as compared with its diameter whereby to permit transverse vibration throughout a considerable portion of its length, the interior of the helix communicating with the exterior of the chamber for the discharge of liquid passing from the chamber into the helix, the coils of the helix being separated to permit the passage of liquid but being sufficiently close to retain and prevent the passage of solid particles to be removed from the liquid, and means to cause transverse vibration of the helix to dislodge solids adhering to its outer surface.

7. A filter comprising a chamber for liquid under pressure, an inlet for liquid into said chamber, a vertical tube within the chamber having its interior communicating with the exterior of the chamber, a filter element comprising a plurality of helical coils of wire having open lower ends and closed upper ends, a manifold for liquid having a plurality of openings to receive the lower ends of the helical coils of wire, a tube secured at its lower end to the manifold and mounted for rotation upon the vertical tube, the rotatable tube having at its upper end a cap, adjusting screws supported by the cap, a hub surrounding the rotatable tube and slidable thereon, and supports for the upper ends of the helical coils attached to said hub, the said adjusting screws carried by the cap engaging the hub to move it up and down on the tube it surrounds to adjust the tension of the helical coils of wire.

8. A filter comprising a chamber for containing liquid, an inlet for liquid into said chamber, a plurality of elastic wires each coiled into a spiral of great length as compared with its diameter and mounted within said chamber under tension with all of the coils substantially uniformly separated to permit the passage of liquid therethrough but to prevent the passage of solid material of a size greater than the separation between the turns of the coils, a passage to the exterior of the chamber in communication with the interior of all of the said coils for discharge of the liquid filtered in the chamber, and means for causing transverse vibration simultaneously to all of said spiral wires to dislodge the solid materials accumulated on said coils by the filtering action thereof.

9. A filter comprising a chamber for containing liquid, an inlet for liquid into said chamber, a plurality of elastic wires each coiled into a spiral of great length as compared with its diameter and mounted within said chamber under tension with all of the coils substantially uniformly separated between the turns to permit the passage of liquid therethrough but to prevent the passage of solid materials of a size greater than the separation between the turns of the coils, a passage to the exterior of the chamber in communication with the interior of all of the coils for discharge of filtered liquid from the container, and means for simultaneously moving all of said spiral wires in said chamber to cause vibration thereof to dislodge the solid materials accumulated on said coils because of the filtering action thereof.

10. A filter comprising a chamber for containing liquid, an inlet for liquid into said chamber, a vertical tube within said chamber having its interior communicating with the exterior of said chamber, a filter element carried by said tube and having a plurality of tubes extending radially outward from said vertical tube, a corresponding plurality of radially arranged supporting arms in substantial arm-to-tube alinement longitudinally of the vertical tube, each of the radial tubes having a plurality of openings, a plurality of elastic helical coils of wire having closed upper ends and open lower ends, the upper ends being supported by the radial arms and the lower ends being held in communication with the openings in the radial tubes to permit lateral vibration and bending of the coils between their ends.

11. A construction as in claim 10 in which a frangible coating of filter aid is supported by the coils and in which the radial tubes at the lower ends of the coils are separated to permit the passage therebetween of matter dislodged from the coils.

12. In a filter which comprises a chamber for liquid having mounted therein a helical coil of wire held under tension between supports at the ends of the coil, said coil communicating with the exterior of the chamber and serving as a support for filter aid held thereon by pressure of the liquid, means connecting the supports for the ends of the coil for simultaneous sidewise movement through the liquid and means for moving the supports sidewise, whereby when said supports are moved sidewise, the resistance of the liquid will cause bending of the coil between the supports to dislodge the filter aid therefrom.

13. A filter comprising a chamber for liquid, an inlet for liquid into said chamber, an elastic wire coiled into a spiral and mounted in said chamber with the turns of the coil separated, the interior of the coil forming a passage for liquid communicating with the exterior of the chamber, and a frangible mass of filter aid supported upon the outer surface of said coil and capable of disruption by vibration of the coil.

14. The process of separating solids from a liquid having solids in suspension which comprises applying pressure to the liquid to force it into contact with a helix of wire forming a filter element communicating with an outlet for filtered liquid, the coils of the helix being separated sufficiently to permit the passage of liquid but being close enough together to retain filter aid, adding filter aid to the liquid to form a first cylindrical coating around the helix, continuing the pressure upon the liquid until solids in suspension form a second coating upon the element of greater resistance to pressure than the filter aid, adding a further quantity of filter aid to form an additional coating of greater diameter and surface but of less resistance to pressure of liquid than the second coating and continuing the pressure upon the liquid until solids in suspension form a fourth coating of greater resistance than the second coating.

STANLEY MALANOWSKI.